United States Patent

Keller et al.

[11] Patent Number: 5,384,880
[45] Date of Patent: Jan. 24, 1995

[54] DIELECTRIC RIBBON OPTICAL FIBER CABLE

[75] Inventors: David A. Keller, Vaureal cergy, France; Frank Davidson, Granite Falls, N.C.; Kevin Black, Hickory, N.C.; George Webb, Icard, N.C.

[73] Assignee: Alcatel NA Cable Systems, Inc., Claremont, N.C.

[21] Appl. No.: 162,573

[22] Filed: Dec. 3, 1993

[51] Int. Cl.⁶ .............................................. G02B 6/44
[52] U.S. Cl. .................................. 385/109; 385/100; 385/111; 385/113; 385/114
[58] Field of Search ............... 385/100, 109, 110, 111, 385/113, 114, 115

[56] References Cited

U.S. PATENT DOCUMENTS

| | | | |
|---|---|---|---|
| Re. 33,459 | 11/1990 | Bohannon, Jr. et al. | 385/107 X |
| 3,883,218 | 5/1975 | Slaughter | 385/100 X |
| 4,078,853 | 3/1978 | Kempf et al. | 385/109 X |
| 4,241,979 | 12/1980 | Gagen et al. | 385/114 X |
| 4,557,560 | 12/1985 | Bohannon, Jr. et al. | 385/114 X |
| 4,709,983 | 12/1987 | Plessner et al. | 385/103 X |
| 4,723,831 | 2/1988 | Johnson et al. | 385/113 X |
| 4,730,894 | 3/1988 | Arroyo | 384/114 X |
| 4,744,631 | 5/1988 | Eichenbaum et al. | 385/114 X |
| 4,765,712 | 8/1988 | Bohannon, Jr. et al. | 385/113 X |
| 4,802,732 | 2/1989 | Fukuma et al. | 385/114 X |
| 4,804,245 | 2/1989 | Katayose et al. | 385/114 X |
| 4,815,813 | 3/1989 | Arroyo et al. | 385/102 X |
| 4,820,014 | 4/1989 | Nishimura et al. | 385/105 |
| 4,836,640 | 6/1989 | Gartside, III et al. | 385/109 X |
| 4,844,575 | 7/1989 | Kinard et al. | 385/113 X |
| 4,859,023 | 8/1989 | Eichenbaum et al. | 385/109 X |
| 4,867,526 | 9/1989 | Arroyo | 385/107 X |
| 4,874,219 | 10/1989 | Arroyo et al. | 385/107 X |
| 4,909,592 | 3/1990 | Arroyo et al. | 385/113 X |
| 4,946,237 | 8/1990 | Arroyo | 385/107 X |
| 4,960,318 | 10/1990 | Nilsson et al. | 385/103 X |
| 4,964,691 | 10/1990 | Nelson et al. | 385/114 X |
| 4,997,257 | 3/1991 | Spedding | 385/114 X |
| 5,029,974 | 7/1991 | Nilsson | 385/109 X |
| 5,125,063 | 6/1992 | Panuska et al. | 385/113 |
| 5,131,064 | 7/1992 | Arroyo et al. | 385/113 X |
| 5,138,685 | 8/1992 | Arroyo et al. | 385/113 |
| 5,165,003 | 11/1992 | Carter | 385/113 X |
| 5,187,763 | 2/1993 | Tu | 385/113 X |
| 5,199,096 | 3/1993 | Kathiresan et al. | 385/109 |
| 5,249,248 | 9/1993 | Arroyo et al. | 385/113 |
| 5,285,513 | 2/1994 | Kaufman et al. | 385/109 |
| 5,305,410 | 4/1994 | Arroyo et al. | 385/109 |
| 5,305,411 | 4/1994 | Arroyo | 385/113 X |
| 5,321,788 | 6/1994 | Arroyo et al. | 385/109 |

Primary Examiner—Brian Healy
Attorney, Agent, or Firm—Ware, Fressola, Van Der Sluys & Adolphson

[57] ABSTRACT

The optical fiber cable has a plurality of centrally located optical fiber ribbons. Carrying the optical fiber ribbons is a gel-filled plastic buffer tube. An adhesive layer is applied along the outside of the buffer tube and yarns extend in a contra-helical pattern over the adhesive. The yarns are impregnated with a gel for lubricating the contact points between the yarns and a longitudinally applied mylar tape layer. The mylar tape layer is coated with a thin layer of sealant which permits application of final polyethylene outer jacket provided for additional cable protection. Embedded within the outer jacket is a pair of diametrically opposed, longitudinally extending strength members.

11 Claims, 1 Drawing Sheet

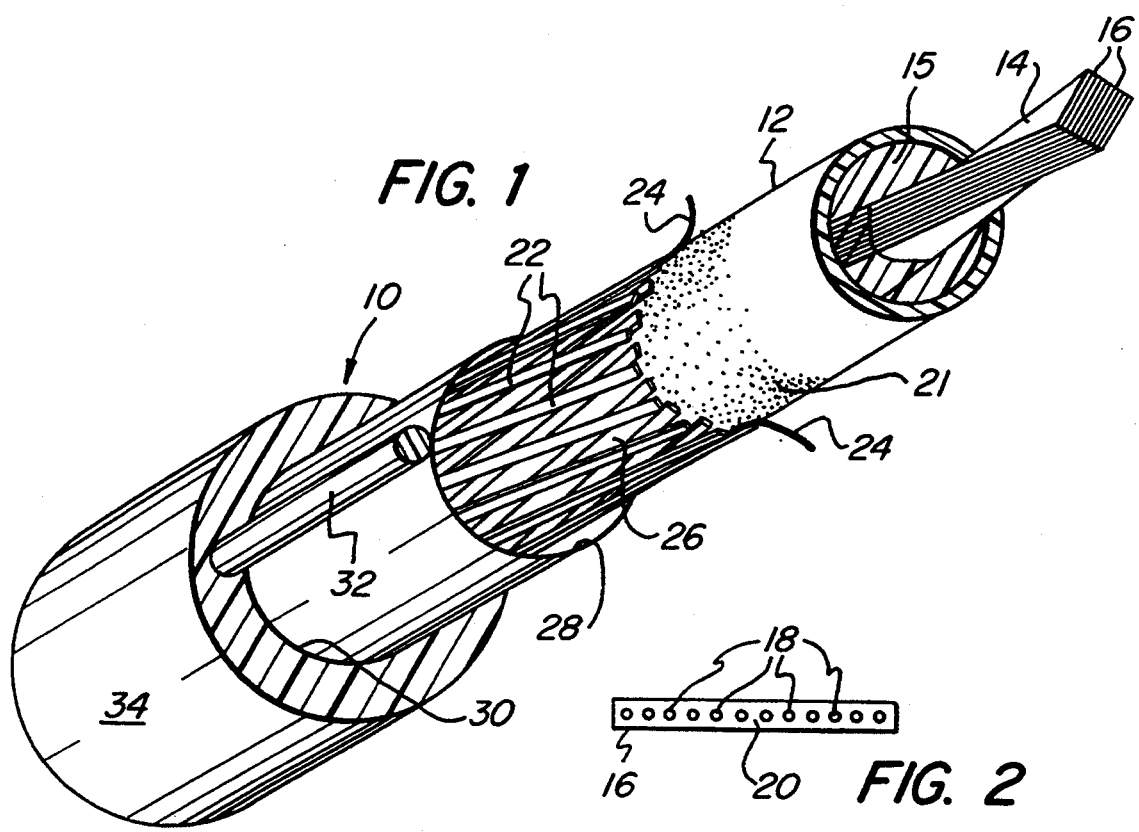
FIG. 1
FIG. 2
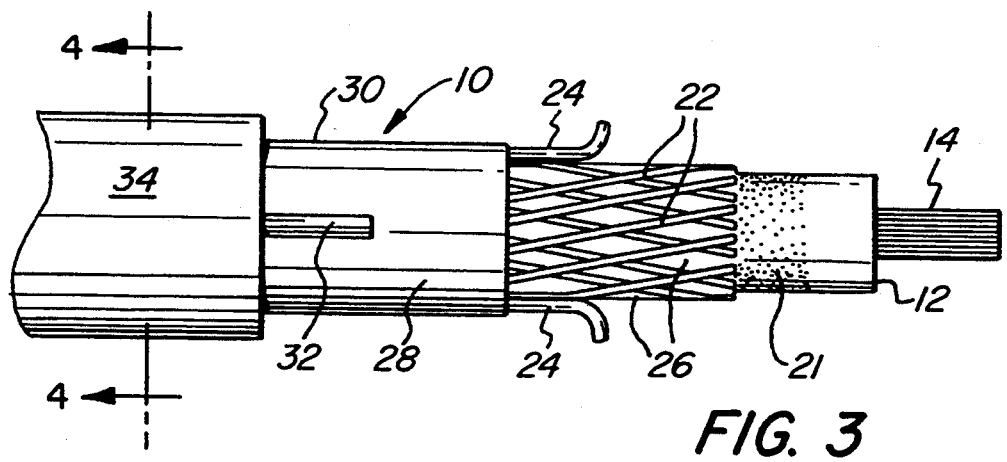
FIG. 3
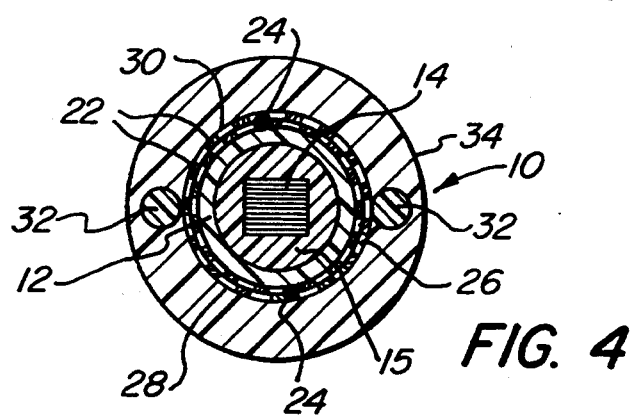
FIG. 4

DIELECTRIC RIBBON OPTICAL FIBER CABLE

BACKGROUND OF THE INVENTION

1. Field of the Invention

The present invention relates to optical fiber cables more particularly, to optical fiber cables in which the optical fibers are imbedded in a matrix material.

2. Description of the Prior Art

Optical fiber cables have been used for the past several years to transmit information at high rates and long distances. The transmission medium is composed of hair-thin optical fibers which are protected from external forces by precisely designed and manufactured cable structures. One such cable is a structure in which all of the optical fibers are in a single, centrally located, gel filled buffer tube. This cable structure can incorporate additional protection which may consist of radially applied strength members, corrugated armor and plastic sheaths. An example of such a single buffer tube structure is shown in U.S. Pat. No. 5,029,574.

In order to simplify construction, installation and maintenance of optical fiber cable, the individual optical fibers are now being held in a planar array called an optical fiber ribbon. In an optical fiber ribbon, a plurality of optical fibers, typically twelve, are held in precise parallel positions in the planar array. The array of optical fibers are held together with an adhesive matrix material such as an ultra-violet curable coating material as disclosed in U.S. Pat. No. 4,900,126. Since the optical fibers are precisely fixed in the ribbon structure, simultaneous mass splicing of the optical fibers can be readily accomplished.

In addition, it has been increasingly desirable to design optical fiber cable structures using all dielectric materials. One example of an all dielectric cable using optical fiber ribbons is produced by the American Telephone and Telegraph Company (AT&T). The AT&T dielectric cable is comprised of optical fiber ribbons, buffer tube filling compound, a polyethelyne tube, water swellable tape, two fiberglass reinforced plastic strength rods, four fiberglass yarn fillers, and a high-density polyethelyne jacket. The AT&T cable requires the longitudinal application of four fiberglass yarns and two fiberglass reinforced plastic strength rods over a water swellable tape to provide for a torsionally flexible cable which meets the customer specification for water flow ingress. The AT&T design utilizes a water swellable compound system which absorbs water. A complete water swellable system absorbs a much larger quantity of water, as compared to a gel filled system, holding the water in place, and allowing an increased level of moisture attack on the other cable materials over time. The moisture may cause mechanical damage to the cable materials when the water freezes at temperatures of 32° F. or below.

Previous attempts to make a gel filled cable utilizing optical fiber ribbons have proved unsuccessful due to poor torsional flexibility and operator handleability.

SUMMARY OF THE INVENTION

The present invent i on is designed to overcome the limitations that are attendant upon the use of the prior art cables described above, and toward this end, it contemplates the provision of a novel optical fiber cable which minimizes the drawbacks of the prior art cables.

It is an object of the present invention to provide a cable design which provides superior torsional flexibility compared to many of the prior art cables to facilitate installation.

Still another object of the present invention is to provide a cable design which can be readily used and accessed by field personnel.

Yet another object is to utilize water blocking gel to prevent the ingress of water and the deleterious effect of water infiltration on cable components.

It is anticipated that the present invention would be applicable for use in many different types of installations including all types of outdoor installation.

A further object is to provide such a cable which may be readily and economically fabricated and will enjoy a long life in operation.

The invention will be more fully understood when reference is made to the following detailed description taken in conjunction with the accompanying drawings.

BRIEF DESCRIPTION OF THE DRAWINGS

FIG. 1 is a perspective cutaway section of an optical fiber cable made in accordance with the present invention;

FIG. 2 is an end view of an optical fiber ribbon used in the present invention;

FIG. 3 is a side elevational view of the optical fiber cable of FIG. 1; and

FIG. 4 is a cross-sectional view taken along the 4—4 line of FIG. 3.

DETAILED DESCRIPTION OF THE PREFERRED EMBODIMENT

Turning first to FIG. 1, therein is illustrated the cable design of the present invention generally indicated by the numeral 10 and having a single, large, gel filled extruded buffer tube 12 made of polyester (PBT) having a stack 14 of optical fiber ribbons 16 therein. Each optical fiber ribbon 16 has a plurality of optical fibers 18 (FIG. 2).

The buffer tube 12 has a high modulus of elasticity (approximately 1930 mPa or 280,000 p.s.i.) thereby permitting a portion of the buffer tube 12 to be removed for accessing to the optical fiber ribbons 16 without completely severing the buffer tube 12. The high modulus buffer tube 12 allows for more mechanical protection for the optical fiber ribbons 16 during splicing. The chemical and mechanical properties of the tube material (PBT) provide improved crush, tensile, water and chemical resistance.

The gel 15 within the buffer tube 12 and surrounding the optical fiber ribbons 16 is a thixotropic, water blockable gel to prevent water ingress. The viscosity range of the gel 15 allows for the free movement of the optical fiber ribbons 16 over the operating temperature range of the cable 10. The gel is preferably a petroleum based silica gel sold under the tradename BUFFERITE 6000 by CasChem, Inc., Bayonne, N.J.

The stack 14 of optical fiber ribbons 16 is desirably helically stranded as shown in FIG. 1. As will be appreciated by those skilled in the art, the optical fiber ribbons 16 are helically stranded in the stack 14 with a particular lay length parameter. The length of this helix lay length parameter is selected to allow the minimum bend radius of the optical fibers 18 to be met, while achieving the optimal performance window of the helix. This resulting helix prevents the optical fiber ribbons 14 from colliding with the wall of the buffer tube during cold temperature extremes. The helix lay length parameter determination is also a function of the area of the optical ribbons 16 as compared to the area of the buffer tube 12. The stack 14 in FIG. 1 has twelve optical fiber ribbons 16 hue this number can be increased or decreased to meet specific needs.

As shown in FIG. 2, each individual optical fiber ribbon 14 has twelve color coded optical fibers 18 embedded in a protective ultra-violet cured plastic resin material 20. Such a ribbon 14 can be made as suggested in U.S. Pat. No. 4,900,126.

During manufacture of the cable 10, a cold pumpable polybutene adhesive 21 sold by BP Performance Polymers, Hackettstown, N.J. under the trade name NAP-TEL 851 is applied over the buffer tube 12. Thereinafter, protective layers of yarn 22 are stranded over the adhesive 21. The yarns 22 are two sets of resin reinforced fiberglass strength yarns with one water swellable yarn included in each set. Each successive set is spun onto the buffer tube 12 over the adhesive 21 in the opposite direction in a contra-helical fashion. The water swellable yarns in the sets are spun 180 degrees opposite each other in order to capture any moisture which might infiltrate into the cable during use. In the event of water ingress, the water is absorbed by the water swellable yarns. A pair of diametrically opposed ripcords 24 made from KEVLAR are longitudinally applied over the yarns 22 to facilitate sheath removal.

The yarns 22 are impregnated by a heat pumpable polybutene gel 26 manufactured by Amoco Chemical Company, Chicago, Ill. under the trade designation CI500 to provide lubrication for promoting torsional rotation of the cable 10. The heat pumpable gel 26 also inhibits water ingress. To allow the cable 10 to bend under cold environmental conditions, it is important that the heat pumpable polybutene gel 26 have a relatively low viscosity (e.g., at 150° C., ASTM D2669-77, 40–60 centipoise).

Longitudinally applied over the heat pumpable gel impregnated yarns 22 is tape layer 28 made from mylar. The mylar tape layer 28 is folded around the protective layers of yarn 22 to keep the heat pumpable gel 26 separated from the remaining elements to be applied outward of the mylar tape layer 28. The heat pumpable gel 26 lubricates the contact surfaces between the yarns 22 and mylar tape layer 28.

To hold the mylar tape layer 28 in position during jacket extrusion, the mylar tape layer 28 is coated with a layer 30 of static polypropelene sealant manufactured by Eastman Chemical products, Inc., Kingsport, Tenn. under the trade designation EASTOBOND D7682-153s (MF5) which has a viscosity (e.g., at 190° C., ASTM D3236-73, 5900±1100 centipoise) significantly higher than the heat pumpable gel 26. Two fiberglass reinforced plastic strength members 32 are located 180 degrees apart on the outside of the mylar tape layer 28. A medium-density polyethylene (MDPE) outer jacket 34 encapsulates the fiberglass reinforced plastic strength members 32 and the mylar tape layer 28 to complete the structure. The sealant layer 30 seals the jacket 34 to the mylar tape layer 28 to prevent water ingress but permits easy jacket removal. The sealant layer 30 also prevents leakage of the heat pumpable gel 26 during jacket extrusion which would contaminate the jacket 34 and inhibit adequate sealing of the jacket 34 to the mylar tape 28.

The jacket 34 is pressure extruded over the fiberglass reinforced plastic strength members 32 to provide mechanical protection, cable roundness and uniformity. The fiberglass reinforced plastic strength members 32 are encapsulated from 250 to 300 degrees allowing some open non-encapsulated surface area adjacent the sealant layer 30. This open area allows for easier access to the fiberglass reinforced plastic strength members 32 during termination yet provides the necessary bonding to anchor the fiberglass reinforced plastic strength members 32 to the jacket 34 in order to improve cable installation. This encapsulant ratio allows mid-span access to the cable without disruption of the fiberglass reinforced plastic strength members or damage to the fiberglass reinforced plastic strength members 32. Partial encapsulation also allows for rotation of the fiberglass reinforced plastic strength members 32, in the event the cable is subject to a severe torsional twist.

The utilization of the longitudinally applied mylar tape layer 22 with a combination of appropriate adhesives, gels and sealants yields a dielectric ribbon cable which facilities installation and provides superior torsional flexibility. The cable design of the present invention is manufacturing and user friendly because it allows application of pressure extrusion techniques and easy removal of the outer jacket allowing modifications to the product after the final process step.

Thus, it can be seen from the foregoing specification and attached drawing that the optical fiber cable of the present invention provides an effective cable design which emphasizes the positive features and minimizes the negative features of the prior art. The cable is ruggedly built and will function adequately for a very long period of time.

The preferred embodiment admirably achieves the objects of the present invention; however, it should be appreciated that departures can be made by those skilled in the art without departing from the spirit and scope of the invention which is limited only by the following claims.

What is claimed is:

1. An optical fiber cable comprised of:
   a single, hollow buffer tube with a first water blocking gel-like compound and at least one optical fiber disposed therein;
   at least one layer of yarn adhesively bonded to an outer portion of said buffer tube;
   a second water blockable gel-like compound impregnating said at least one layer of yarn;
   a tape layer applied over said at least one layer of yarn and said second water blockable gel-like compound;
   a sealant compound applied over said tape layer;
   a plastic jacket which encapsulates said tape layer and bonds to said sealant compound; and
   two longitudinally extending strength members adjacent said tape layer and at least partially embedded in said jacket approximately 180 degrees apart.

2. A cable as described in claim 1, wherein said second water blockable gel-like compound impregnating said at least one layer of yarn has a viscosity lower than that of said sealant compound applied over said tape layer.

3. A cable as described in claim 1, wherein said at least one optical fiber is a plurality of optical fibers in a protective coating forming at least one optical fiber ribbon.

4. A cable as described in claim 1, wherein said at least one optical fiber is a stack of optical fiber ribbons.

5. A cable as described in claim 4, wherein said stack is helically twisted within said buffer tube.

6. A cable as described in claim 1, wherein said at least one layer of yarn comprises two contra-helically applied layers of yarns.

7. A cable as described in claim 1, wherein said at least one layer of yarn comprises strength yarns and water swellable yarns.

8. A cable as described in claim 1, further including at least one ripcord longitudinally disposed over said at least one layer of yarns.

9. A cable as described in claim 1, wherein said tape layer is longitudinally applied over said at least one layer of yarn and said second water blockable gel-like compound.

10. A cable as described in claim 1, wherein said tape layer is non-metallic.

11. A cable as described in claim 1, wherein said tape layer is a mylar tape layer.

* * * * *